US006779047B1

(12) United States Patent
Caddes et al.

(10) Patent No.: US 6,779,047 B1
(45) Date of Patent: Aug. 17, 2004

(54) SERIAL COMMUNICATION PORT ARBITRATION BETWEEN A HOTSYNC MANAGER AND A WIRELESS CONNECTION MANAGER

(75) Inventors: Scott Caddes, Sandy, UT (US); Stuart Louis Timm, Riverton, UT (US); Kenin Page, Sandy, UT (US); Randy C. Smith, Kaysville, UT (US)

(73) Assignee: 3Com Corporation, Santa Clara, CA (US)

(*) Notice: Subject to any disclaimer, the term of this patent is extended or adjusted under 35 U.S.C. 154(b) by 479 days.

(21) Appl. No.: 09/790,037

(22) Filed: Feb. 20, 2001

(51) Int. Cl.[7] .................. G06F 13/14; G06F 13/00; G06F 13/38; G06F 12/00; G06F 15/16
(52) U.S. Cl. ................. 710/15; 710/2; 710/8; 710/16; 710/18; 710/36; 710/37; 710/40; 710/62; 710/72; 710/64; 710/104; 710/107; 710/240; 710/300; 710/302; 710/303; 710/304; 710/309; 709/248; 719/321
(58) Field of Search .................. 710/8, 14–16, 710/18, 36, 37, 40, 62, 72, 300, 302, 303, 304, 104, 107, 113, 119, 309, 240, 241, 242, 238, 61, 64; 709/248, 400, 238, 321; 719/321

(56) References Cited

U.S. PATENT DOCUMENTS 6,240,472 B1 * 5/2001 Hu .......................... 710/72
6,279,054 B1 * 8/2001 Boyle ...................... 710/36
6,493,771 B1 * 12/2002 Fong ....................... 710/15
6,523,073 B1 * 2/2003 Kammer et al. ........... 710/48
6,560,660 B1 * 5/2003 Flanagin .................. 710/15
2002/0016868 A1 * 2/2002 Peacock .................. 709/321

OTHER PUBLICATIONS

Port Sharing and Communication Hardware Resource Pooling, IBM Technical Disclosure Bulletin, Oct. 1989, US vol. No. 32, Issue 5A, pp. 57–58.*

* cited by examiner

Primary Examiner—Jeffrey Gaffin
Assistant Examiner—Tanh Q. Nguyen

(57) ABSTRACT

Within one embodiment of the present invention, arbitration software operating on a computer is able to determine whether communication software utilizes the same serial communication (COM) port of the computer as a HotSync Manager. If they do use the same serial COM port, the present embodiment arbitration software shuts down the HotSync Manager, if its running, thereby enabling the serial COM port to be utilized for other purposes (e.g., wireless modem communication). However, if the present embodiment arbitration software detects a HotSync Request received via the serial COM port, it runs the HotSync Manager enabling a HotSync process to occur between (for example) a personal digital assistant (PDA) and the computer. Once the present embodiment arbitration software detects the completion of the HotSync process, it shuts down the HotSync Manager until it detects the next HotSync Request.

28 Claims, 4 Drawing Sheets

SERIAL COMMUNICATION PORT ARBITRATION BETWEEN A HOTSYNC MANAGER AND A WIRELESS CONNECTION MANAGER

TECHNICAL FIELD

The present invention generally relates to the field of computers. More particularly, the present invention relates to the field of communication ports of computers.

BACKGROUND ART

Computers and other electronic devices have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic device is dramatically enhanced by coupling these type of stand-alone devices together in order to form a networking environment. Within a networking environment, users may readily exchange files, share information stored on a common database, pool resources, and communicate via electronic mail (e-mail) and video teleconferencing. Furthermore, computers along with other types of electronic devices which are coupled to the Internet provide their users access to data and information from all over the world. Computer systems have become useful in many aspects of everyday life both for personal and business uses.

It is appreciated that a computer (e.g., desktop or laptop) may be communicatively coupled to the Internet or other computers via wired or wireless technologies. For example, a Global System for Messaging (GSM) digital cellular phone may be attached to a serial communication (COM) port of a computer thereby enabling the computer to wirelessly communicate with the Internet or other computers via the GSM cell phone.

Moreover, other types of electronic devices such as a personal digital assistant (PDA) may be communicatively coupled to a serial COM port of a computer. It is understood that a PDA is a portable computer system that is small enough to be held in the hand of its user and can be "palm-sized." Typically, a PDA has the ability to be communicatively coupled to a serial COM port of the computer thereby enabling a process of synchronizing data stored by the PDA with corresponding data stored by the computer. Specifically, this synchronization process exchanges and updates corresponding data between the PDA and the computer. As such, changes to the corresponding data stored by the PDA and/or the computer appear in both places after the synchronization process is completed. This type of synchronization process is referred to as a HotSync® process by Palm, Inc. (a popular manufacturer of PDAs and PDA operating systems) of Santa Clara, Calif. Usually, in order for a HotSync process to occur, HotSync Manager software is installed on the computer. The HotSync Manager software controls the HotSync process between the PDA and the computer.

Since a computer typically has a limited number of physical serial COM ports (e.g., some laptop computers only have one), a user may desire to use the same serial COM port for both a HotSync process and utilizing a GSM cell phone to wirelessly communicate. However, there are disadvantages associated with using the same serial COM port for both of these applications. For example, one of the disadvantages is that a HotSync Manager operating in the background of the computer does not allow the GSM cell phone software application to utilize the same serial COM port that the HotSync Manager is currently using. Specifically, when the computer user tries to launch the GSM software in order to enable the computer to communicate over a GSM cell phone, the computer provides an error message indicating that it was unable to open the serial COM port.

It should be appreciated that some computers (e.g., laptops) are implemented with one or more infrared (IR) serial COM ports which also exhibit the same conflict described above. However, a company (ZiLOG, Inc. of Campbell, Calif.) has developed software that enables sharing of an infrared serial COM port so that a cell phone (for example) having infrared communication capability can use the same infrared serial COM port that has been opened by (or configured to be used by) a HotSync Manager. However, there are disadvantages associated with this prior art solution.

One disadvantage is that the prior art solution only operates with infrared serial COM ports. It should be appreciated that infrared serial COM ports are typically not installed with desktop computers and they are not installed with some laptop computers. Therefore, the prior art solution is not useful for computers installed with other types of serial COM ports (e.g., RS232) that do not involve infrared technology.

DISCLOSURE OF THE INVENTION

Accordingly, what is needed is a method and system for enabling a communication application to utilize a non-infrared serial COM port that was previously used for a HotSync process controlled by a HotSync Manager. Embodiments of the present invention provide a method and system which accomplishes the above mentioned need.

Specifically, within one embodiment of the present invention, arbitration software operating on a computer is able to determine whether communication software utilizes the same serial communication (COM) port of the computer as a HotSync Manager. If they do use the same serial COM port, the present embodiment arbitration software shuts down the HotSync Manager, if it is running, thereby enabling the serial COM port to be utilized for other purposes (e.g., wireless modem communication). However, if the present embodiment arbitration software detects a HotSync Request received via the serial COM port, it runs the HotSync Manager enabling a HotSync process to occur between (for example) a personal digital assistant (PDA) and the computer. Once the present embodiment arbitration software detects the completion of the HotSync process, it shuts down the HotSync Manager until it detects the next HotSync Request.

There are advantages associated with the communication port arbitrator in accordance with the present invention. For example, one of the advantages is that other communication software programs are able to utilize the same serial COM port that was previously utilized by a HotSync Manager. As such, a computer user is not concerned with conflicts when utilizing the same serial COM port for different communication functions. Another advantage is that the communication port arbitrator of the present invention is able to operate with any type of communication port of a computing device.

In another embodiment, the present invention includes a computer readable medium having computer readable code embodied therein for causing a computer to perform particular steps. The computer readable medium causes the computer to perform the step of determining whether a first and second communication applications utilize a communication port of the computer. It is appreciated that the second communication application does not share the communication port while operating on the computer. In response to the first and second communication applications utilizing the communication port, the computer readable medium causes the computer to perform the step of determining whether the second communication application is operating on the computer. In response to the second communication application operating on the computer, the computer readable medium causes the computer to perform the step of turning off the second communication application. Additionally, the computer readable medium causes the computer to perform the step of allowing communication via the communication port involving the first communication application. The computer readable medium also causes the computer to perform the step of determining whether a request for a communication process involving the second communication application has been received. In response to receiving the request, the computer readable medium causes the computer to perform the step of activating the second communication application. Furthermore, the computer readable medium causes the computer to perform the step of determining whether the communication process involving the second communication application has been completed. In response to the communication process involving the second communication application being completed, the computer readable medium causes the computer to perform the step of turning off the second communication application such that control of said communication port is not monopolized by said second communication application.

In yet another embodiment, the present invention includes a computer readable medium having computer readable code embodied therein for causing a computer to perform the particular steps described above in the previous paragraph along with an additional step. Specifically, after all of the particular steps described above are performed, the computer readable medium causes the computer to repeat the step of allowing communication via the communication port involving the first communication application.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
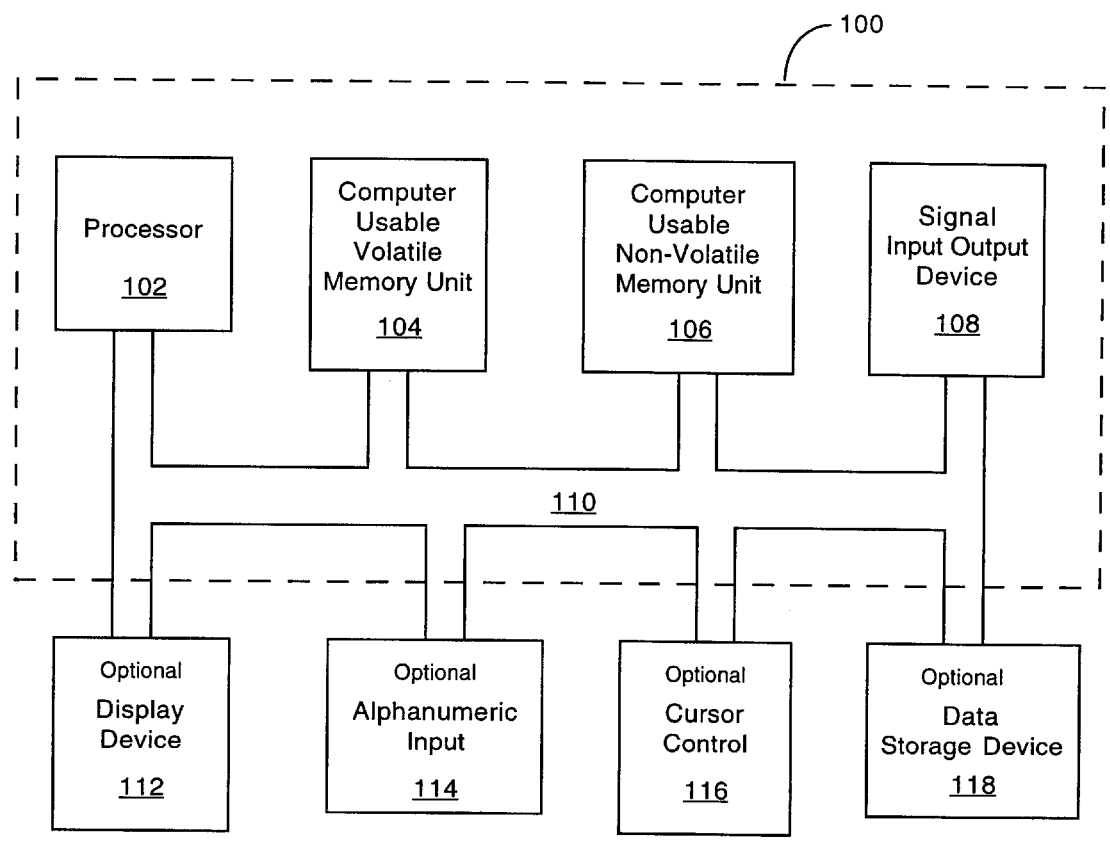
FIG. 1 is a block diagram of one embodiment of an exemplary computer system used in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "determining" or "allowing" or "activating" or "controlling" or "transmitting" or "receiving" or "recognizing" or "generating" or "utilizing" or "turning off" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Computer System in Accordance with the Present Invention

FIG. 1 is a block diagram of one embodiment of an exemplary computer system 100 used in accordance with the present invention. It should be appreciated that system 100 of the present embodiment is well suited to be other types of computers (e.g., portable laptop computer, desktop computer, and the like). Within the following discussions of the present invention, certain processes and steps are discussed that are realized, in one embodiment, as a series of instructions (e.g., software program) that reside within computer readable memory units of computer system 100 and executed by processor(s) of system 100. When executed, the instructions cause system 100 to perform specific actions and exhibit specific behavior which is described in detail below.

In general, computer system 100 of FIG. 1 used by an embodiment of the present inventions comprises an address/data bus 110 for communicating information, one or more central processors 102 coupled with bus 110 for processing information and instructions. Central processor unit 102 may be a microprocessor or any other type of processor. The computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes a signal generating and receiving device 108 coupled with bus 110 for enabling system 100 to interface with other electronic devices. In one embodiment of the present invention, the communication interface 108 is a serial communication port, but could also alternatively be of any of a number of well known communication standards and protocols, e.g., parallel, small computer system interface (SCSI), Ethernet, FireWire (IEEE 1394), Universal Serial Bus (USB), Infrared (IR) communication, Bluetooth, etc.

Optionally, computer system 100 can include a display device 112 which is coupled to bus 110 for displaying graphics and/or video. It should be appreciated that optional display device 112 may be a cathode ray tube (CRT), flat panel liquid crystal display (LCD), field emission display (FED), or other display device suitable for displaying video and/or graphic images and alphanumeric characters recognizable to a user. Furthermore, system 100 can include an optional alphanumeric input device 114 including alphanumeric and function keys coupled to the bus 110 for communicating information and command selections to the central processor(s) 102.

Additionally, the computing device 100 of FIG. 1 can include an optional cursor control or cursor directing device 116 coupled to the bus 110 for communicating user input information and command selections to the central processor(s) 102. The cursor directing device 116 can be implemented using a number of well known devices such as a mouse, a track-ball, a track pad, an optical tracking device, a touch screen, etc. Alternatively, it is appreciated that a cursor can be directed and/or activated via input from alphanumeric input device 114 using special keys and key sequence commands. The present invention is also well suited to directing a cursor by other means such as, for example, voice commands. In addition, the cursor directing device 116 can also be a remote control device (e.g., a universal remote control device having a number of buttons, dials, etc.) with an infra-red signal communication capability. System 100 can also include a computer usable mass data storage device 118 such as a magnetic or optical disk and disk drive (e.g., hard drive or floppy diskette) coupled with bus 110 for storing information and instructions.

Detailed Description of Exemplary Structures of the Present Invention

Figure 2A:
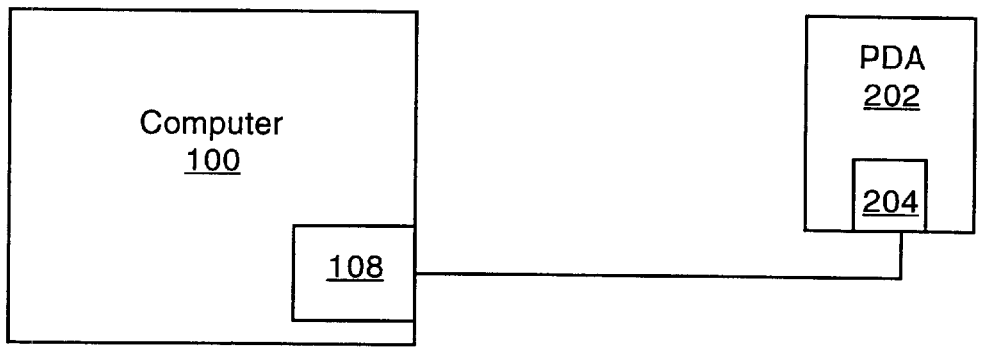
FIG. 2A is a block diagram illustrating an system wherein a computer is communicatively coupled to a personal digital assistant (PDA) in accordance with one embodiment of the present invention.

The present discussion will begin with a detailed description of the structures and physical components of some of the embodiments of the present invention. The discussion will then describe in detail the operation of some of the embodiments of the present invention. FIG. 2A is a block diagram illustrating a system 200 wherein computer 100 (FIG. 1) is communicatively coupled to a personal digital assistant (PDA) 202 in accordance with one embodiment of the present invention. It is understood that personal digital assistant 202 is a portable computing device that is fabricated small enough to be held in the hand of its user and may be "palm-sized." Furthermore, a communication interface 204 enables personal digital assistant 202 to interface with other electronic devices. Specifically, within system 200 the communication interface 204 of personal digital assistant 202 is capable of interfacing with the communication interface 108 of computer 100. Therefore, two way communication may occur between computer 100 and personal digital assistant 202. It should be appreciated that in one embodiment of the present invention, communication interfaces 108 and 204 are serial communication (COM) ports that may communicate utilizing wired or wireless technology. Furthermore, communication interfaces 108 and 204 may also be any of a number of well known communication standards and protocols, e.g., parallel, small computer system interface (SCSI), Ethernet, FireWire (IEEE 1394), Universal Serial Bus (USB), infrared (IR) communication, Bluetooth, and the like.

Figure 2B:
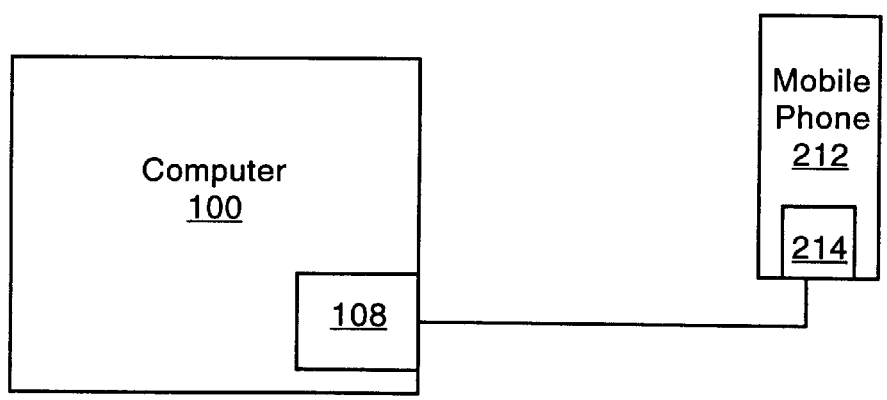
FIG. 2B is a block diagram illustrating an system wherein a computer is communicatively coupled to a mobile phone in accordance with one embodiment of the present invention.

FIG. 2B is a block diagram illustrating a system 210 wherein computer 100 (FIG. 1) is communicatively coupled to a mobile phone 212 in accordance with one embodiment of the present invention. It is appreciated that mobile phone 212 of the present embodiment is well suited to be implemented in a wide variety of ways. For example, mobile phone 212 may utilize digital cellular technology such as Global System for Messaging (GSM) or Code Division Multiple Access (CDMA). Additionally, a communication interface 214 enables mobile phone 212 to interface with other electronic devices. Specifically, within system 210 the communication interface 214 of mobile phone 212 is capable of interfacing with the communication interface 108 of computer 100. Therefore, two way communication may occur between computer 100 and mobile phone 212. It should be understood that in one embodiment of the present invention, communication interfaces 108 and 214 are serial communication (COM) ports that may communicate utilizing wired or wireless technology. Moreover, communication interfaces 108 and 214 may also be any of a number of well known communication standards and protocols, e.g., parallel, small computer system interface (SCSI), Ethernet, FireWire (IEEE 1394), Universal Serial Bus (USB), infrared (IR) communication, Bluetooth, and the like.

Detailed Description of Exemplary Operations of the Present Invention

Figure 3:
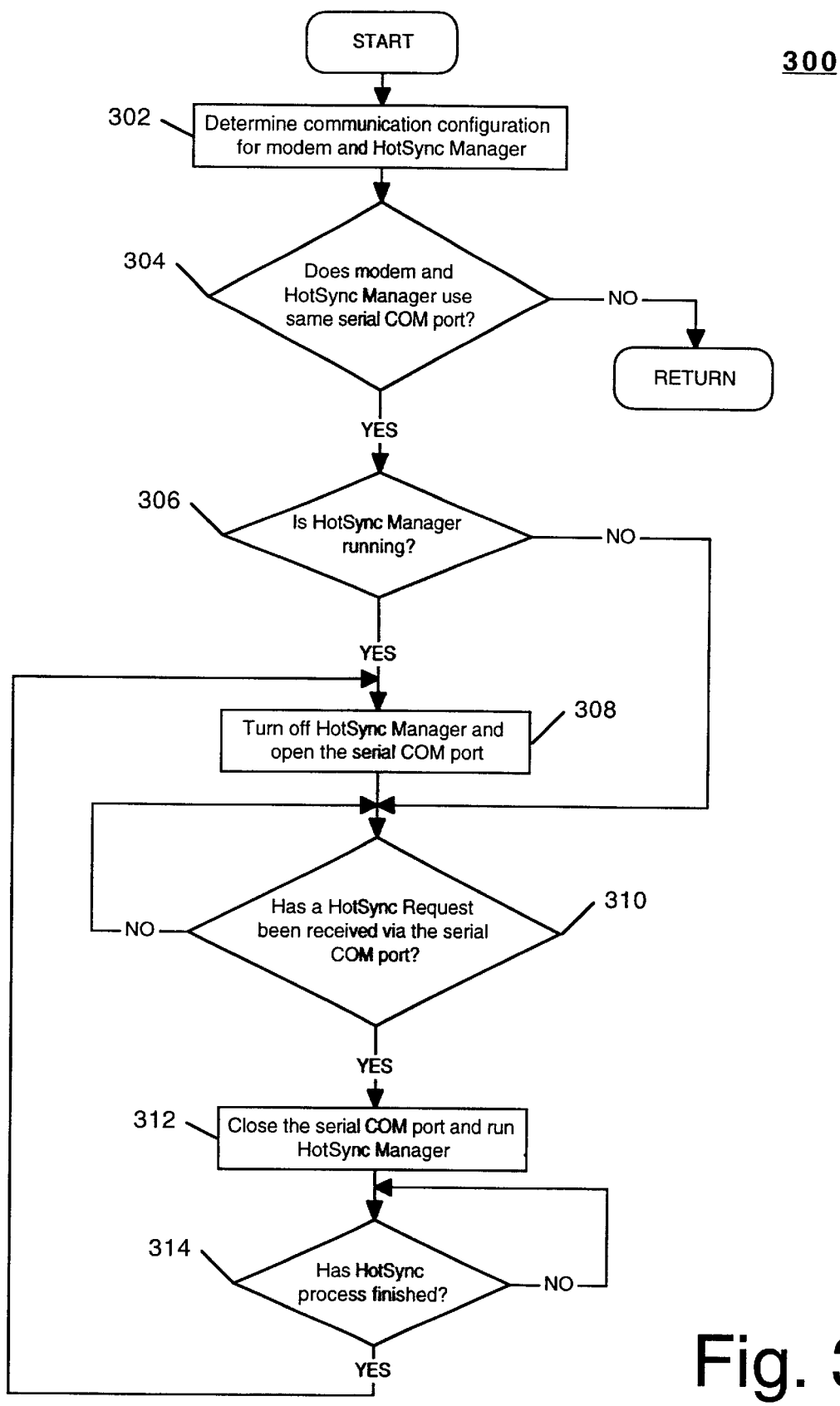
FIG. 3 is a flowchart of steps performed in accordance with one embodiment of the present invention for providing serial communication port arbitration between HotSync Manager software and wireless connection manager software.

FIG. 3 is a flowchart 300 of steps performed in accordance with one embodiment of the present invention for providing serial communication (COM) port arbitration between HotSync Manager software and wireless connection manager software. Flowchart 300 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable nonvolatile memory 106 of FIG. 1. However, the computer readable and computer executable instructions may reside in any type of computer readable medium. Although specific steps are disclosed in flowchart 300, such steps are exemplary. That is, the present invention is well suited to performing various other steps or variations of the steps recited in FIG. 3. Within the present embodiment, it should be appreciated that the steps of flowchart 300 may be performed by software or hardware or any combination of software and hardware.

The present embodiment determines whether a communication application utilizes the same serial communication (COM) port of a computer (e.g., 100 of FIG. 1) as a HotSync Manager. If they do use the same serial COM port, the present embodiment shuts down the HotSync Manager, if its running, thereby enabling the serial COM port to be utilized for other purposes (e.g., wireless modem communication). However, if the present embodiment detects a HotSync Request received via the serial COM port, it runs the HotSync Manager enabling a HotSync process to occur between (for example) a personal digital assistant (PDA) and the computer. Once the present embodiment detects the completion of the HotSync process, it shuts down the HotSync Manager until it detects the next HotSync Request. It should be appreciated that the present embodiment may be incorporated with the communication application that utilizes the serial COM port of the computer.

At step 302, the present embodiment determines the communication car of a computer (e.g., 100 of FIG. 1). Step 302 of the present embodiment is well suited to be implemented in wide variety of ways. For example, in order to determine the communication configuration of the HotSync Manager, the present embodiment calls the HotSync Manager API (application programming interface) entitled: "CmGetComPort()" located within condmgr.dll. Furthermore, if the present embodiment were to determine the communication configuration of the modem wherein the computer is running Microsoft Windows 95 or Windows 98, the present embodiment would go to the system registry and look at each key within the file entitled: "HKEY_LOCAL_MACHINE\SYSTEM\CurrentControlSet\Services\Class\-Modem". If the modem's name matches the key's "DriverDesc" value, then the present embodiment uses the key's "AttachedTo" value as the communications port and the key's "DCB" value as the data control block (DCB). However, if "AttachedTo" is not present, the present embodiment looks at each subkey of the file entitled: "HKEY_LOCAL_MACHINE\Enum" until a key's "FriendlyName" matches the modem's name. When there is a match, the present embodiment uses the key's "PORTNAME" value as the communications port.

Additionally, at step 302, if the present embodiment were to determine the communication configuration of the modem wherein the computer is running Microsoft Windows 4.0 or a later version (including Windows 2000), the present embodiment would go to the system registry and look at each key within the file entitled: "SYSTEM\\CurrentControlSet\\Control\\Class\\-{4D36E96D-E325-11CE-BFC1-08002BE10318}". If the modem's name matches the key's " FriendlyName" value, then the present embodiment uses the key's "AttachedTo" value as the communications port and the key's "DCB" value as the DCB.

In step 304 of FIG. 3, the present embodiment determines whether the modem and the HotSync Manager utilize the same serial communication (COM) port (e.g., 108) of the computer. If the present embodiment determines that the modem and the HotSync Manager do not utilize the same serial COM port of the computer at step 304, the present embodiment exits flowchart 300. However, if the present embodiment determines that the modem and the HotSync Manager utilize the same serial COM port of the computer at step 304, the present embodiment proceeds to step 306.

At step 306, the present embodiment determines whether the HotSync Manager is currently running on the computer. If the HotSync Manager is not running on the computer at step 306, the present embodiment proceeds to step 310. However, if the HotSync Manager is running on the computer at step 306, the present embodiment proceeds to step 308.

In step 308, the present embodiment shuts down the HotSync Manager and opens the serial COM port of the computer. For example, the present embodiment may shut down the HotSync Manager by calling the HotSync Manager API entitled: "HsSetAppStatus()" located within HSAPI.dll. Furthermore, the present embodiment may utilize standard Microsoft Windows API calls to open the serial COM port and also to receive data on the serial COM port. It is understood that once step 308 is completed, the present embodiment has taken control of the serial COM port and may allow other types of communication applications (e.g., modem application) to utilize the serial COM port of the computer. For example, mobile phone 212 may be communicatively coupled to the serial COM port (e.g., 108) of the computer (e.g., 100) thereby enabling it to communicate with the computer as described above with reference to FIG. 2B. Therefore, the present embodiment turns off the HotSync Manager at step 308 such that control of the serial COM port is not monopolized by the HotSync Manager.

At step 310 of FIG. 3, the present embodiment determines whether a HotSync Request has been received via the serial COM port. For example, the present embodiment may process data coming into the serial COM port looking for a pattern of data that matches a HotSync Request. The pattern of data of a HotSync Request may include three consecutive bytes of data having the decimal values 190, 239, and 237. It is appreciated that if a HotSync Request has not been received via the serial COM port at step 310, the present embodiment proceeds to the beginning of step 310. However, if a HotSync Request has been received via the serial COM port at step 310, the present embodiment proceeds to step 312. It is appreciated that if a HotSync Request is received via the serial COM port at step 310, a personal digital assistant (e.g., 202) may be communicatively coupled to the serial COM port (e.g., 108) of the computer (e.g., 100) as described above with reference to FIG. 2A.

In step 312, the present embodiment closes the serial COM port (e.g., 108) and runs the HotSync Manager. For example, the present embodiment may utilizes a standard Microsoft Windows API call in order to close the serial COM port at step 312. Additionally, the present embodiment may run the HotSync Manager at step 312 by calling the HotSync Manager API entitled: "HsSetAppStatus()" located within HSAPI.dll.

At step 314 of FIG. 3, the present embodiment determines whether the HotSync process has reached completion. For example, the present embodiment may determine that the HotSync process has reached completion by calling the HotSync Manager API entitled: "HsSetSyncStatus()" located within HSAPI.dll. It should be appreciated that the present embodiment may perform this call to the HotSync Manager API at any type of time interval (e.g., every 300 milliseconds). If the HotSync process has not reached completion at step 314, the present embodiment proceeds to the beginning of step 314. However, if the HotSync process has reached completion at step 314, the present embodiment proceeds to the beginning of step 308. It is appreciated that the present embodiment may be operating in the background of the computer at step 314.

Figure 4:
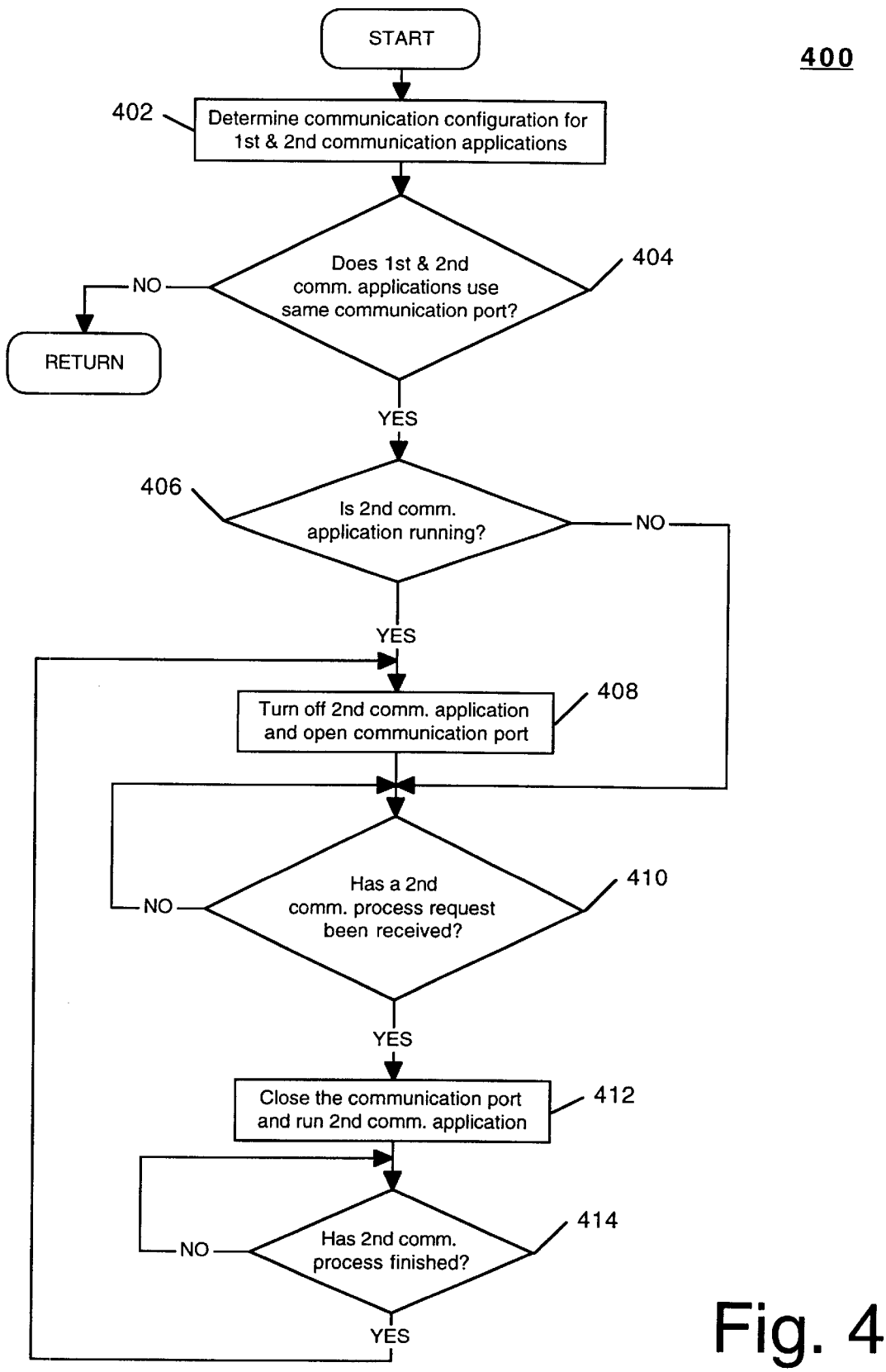
FIG. 4 is a flowchart of steps performed in accordance with one embodiment of the present invention for providing communication port arbitration.

FIG. 4 is a flowchart 400 of steps performed in accordance with one embodiment of the present invention for providing communication port arbitration. Flowchart 400 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 400, such steps are exemplary. That is, the present invention is well suited to performing various other steps or variations of the steps recited in FIG. 4. Within the present embodiment, it should be appreciated that the steps of flowchart 400 may be performed by software or hardware or any combination of software and hardware.

The present embodiment determines whether a first and second communication applications utilize the same communication port (e.g., 108) of a computer (e.g., 100 of FIG. 1), wherein the second communication application does not share the communication port while active. If they do use the same communication port, the present embodiment shuts down the second communication application (if its active) thereby enabling the communication port to be utilized for other purposes (e.g., by the first communication application). However, if the present embodiment detects a second communication process request (e.g., via the communication port), it runs the second communication application enabling a second communication process to occur via the communication port. Once the present embodiment detects the completion of the second communication process, it shuts down the second communication application until it detects the next second communication process request.

At step 402, the present embodiment determines the communication configuration of a first and second communication applications of a computer (e.g., 100 of FIG. 1) wherein the second communication application does not share its communication port (e.g., 108) while active.

In step 404 of FIG. 4, the present embodiment determines whether the first and second communication applications utilize the same communication port (e.g., 108) of the computer. If the present embodiment determines that the first and second communication applications do not utilize the same communication port of the computer at step 404, the present embodiment exits flowchart 400. However, if the present embodiment determines that the first and second communication applications do utilize the same communication port of the computer at step 404, the present embodiment proceeds to step 406.

At step 406, the present embodiment determines whether the second communication application is currently running on the computer. If the second communication application is not running on the computer at step 406, the present embodiment proceeds to step 410. However, if the second communication application is running on the computer at step 406, the present embodiment proceeds to step 408.

In step 408, the present embodiment shuts down the second communication application and opens the communication port of the computer. It is understood that once step 408 is completed, the present embodiment has taken control of the communication port and may allow other types of communication applications (e.g., first) to utilize the communication port of the computer. Therefore, the present embodiment turns off the second communication application at step 408 such that control of the communication port is not monopolized by the second communication application.

At step 410 of FIG. 4, the present embodiment determines whether a second communication process request has been received (e.g., via the communication port). It is appreciated that if a second communication process request has not been received at step 410, the present embodiment proceeds to the beginning of step 410. However, if a second communication process request has been received at step 410, the present embodiment proceeds to step 412.

In step 412, the present embodiment closes the communication port (e.g., 108) and runs the second communication application.

At step 414, the present embodiment determines whether the second communication process has reached completion. If the second communication process has not reached completion at step 414, the present embodiment proceeds to the beginning of step 414. However, if the second communication process has reached completion at step 414, the present embodiment proceeds to the beginning of step 408.

Accordingly, embodiments of the present invention provide a method and system for enabling a communication application to utilize a serial COM port that was previously used for a HotSync process controlled by a HotSync Manager.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing communication port arbitration between two communication applications, said method comprising:

determining a communication configuration of a first and second communication applications of a computer;

determining whether said first and second communication applications utilize a communication port of said computer, wherein said second communication application does not share said communication port while operating on said computer;

in response to said first and second communication applications utilizing said communication port, determining whether said second communication application is operating on said computer;

in response to said second communication application operating on said computer, turning off said second communication application;

in response to said second communication application not operating on said computer, allowing communication via said communication port involving said first communication application;

determining whether a request for a communication process involving said second communication application has been received;

in response to receiving said request, activating said second communication application;

determining whether said communication process involving said second communication application has been completed; and in response to said communication process involving said second communication application being completed, turning off said second communication application such that control of said communication port is not monopolized by said second communication application.

2. The method as described in claim 1 wherein said second communiction application comprises a HotSync Manager.

3. The method as described in claim 1 wherein said first communication application relates to a modem.

4. The method as described in claim 1 wherein said first communication application relates to a wireless modem.

5. The method as described in claim 1 wherein said communication port comprises a serial communication port.

6. The method as described in claim 1 wherein said communication port comprises Bluetooth communication.

7. The method as described in claim 1 wherein said communication port comprises infrared communication.

8. The method as described in claim 1 wherein said communication port comprises Universal Serial Bus (USB) communication.

9. The method as described in claim 1 wherein said communication port comprises FireWire (IEEE 1394) communication.

10. The method as described in claim 1 wherein said computer is a laptop computer or a desktop computer.

11. A method for providing serial communication port arbitration between a communication application and a HotSync Manager, said method:

determining whether said communication application and said HotSync Manager utilize a serial communication port of a computer, wherein said HotSync Manager does not share said serial communication port while operating on said computer;

determining whether said HotSync Manager is operating on said computer if determined that said communication application and said HotSync Manager utilize said serial communication port;

turning off said HotSync Manager if determined that said HotSync Manager is operating on said computer;

allowing communication via said serial communication port involving said first communication application if determined that said HotSync Manager is not operating on said computer;

determining whether a request for a HotSync process involving said HotSync Manager has been received;

activating said HotSync Manager if determined that said request has been received;

determining whether said HotSync process has been completed; and turning off said HotSync Manager such that control of said serial communication port is not monopolized by said HotSync Manager if determined said HotSync process has been completed.

12. The method as described in claim 11 wherein said communication application relates to a modem.

13. The method as described in claim 11 wherein said communication application relates to a wireless modem.

14. The method as described in claim 11 wherein said serial communication port comprises Bluetooth communication.

15. The method as described in claim 11 wherein said serial communication port comprises infrared communication.

16. The method as described in claim 11 wherein said serial communication port comprises Universal Serial Bus (USB) communication.

17. The method as described in claim 11 wherein said serial communication port comprises FireWire (IEEE 1394) communication.

18. The method as described in claim 11 wherein said computer is a laptop computer or a desktop computer.

19. A computer readable medium having computer readable code embodied therein for causing a computer to perform a method comprising:

determining whether a first and second communication applications utilize a communication port of said computer, wherein said second communication application does not share said communication port while operating on said computer;

in response to said first and second communication applications utilizing said communication port, determining whether said second communication application is operating on said computer;

in response to said second communication application operating on said computer, turning off said second communication application;

in response to said second communication application not operating on said computer, allowing communication via said communication port involving said first communication application;

determining whether a request for a communication process involving said second communication application has been received;

in response to receiving said request, activating said second communication application;

determining whether said communication process involving said second communication application has been completed; and in response to said communication process involving said second communication application being completed, turning off said second communication application such that control of said communication port is not monopolized by said second communication application.

20. The computer readable medium as described in claim 19 wherein said second communication application comprises a HotSync Manager.

21. The computer readable medium as described in claim 19 wherein said first communication application relates to a modem.

22. The computer readable medium as described in claim 19 wherein said first communication application relates to a wireless modem.

23. The computer readable medium as described in claim 19 wherein said communication port comprises a serial communication port.

24. The computer readable medium as described in claim 19 wherein said communication port comprises Bluetooth communication.

25. The computer readable medium as described in claim 19 wherein said communication port comprises infrared communication.

26. The computer readable medium as described in claim 19 wherein said communication port comprises Universal Serial Bus (USB) communication.

27. The computer readable medium as described in claim 19 wherein said communication port comprises FireWire (IEEE 1394) communication.

28. The computer readable medium as described in claim 19 wherein said method further comprising:
    determining a communication configuration of said first and second communication applications.

* * * * *